(No Model.)
D. A. ZAN.
PROTECTIVE ARMOR FOR PNEUMATIC TIRES.
No. 560,883. Patented May 26, 1896.
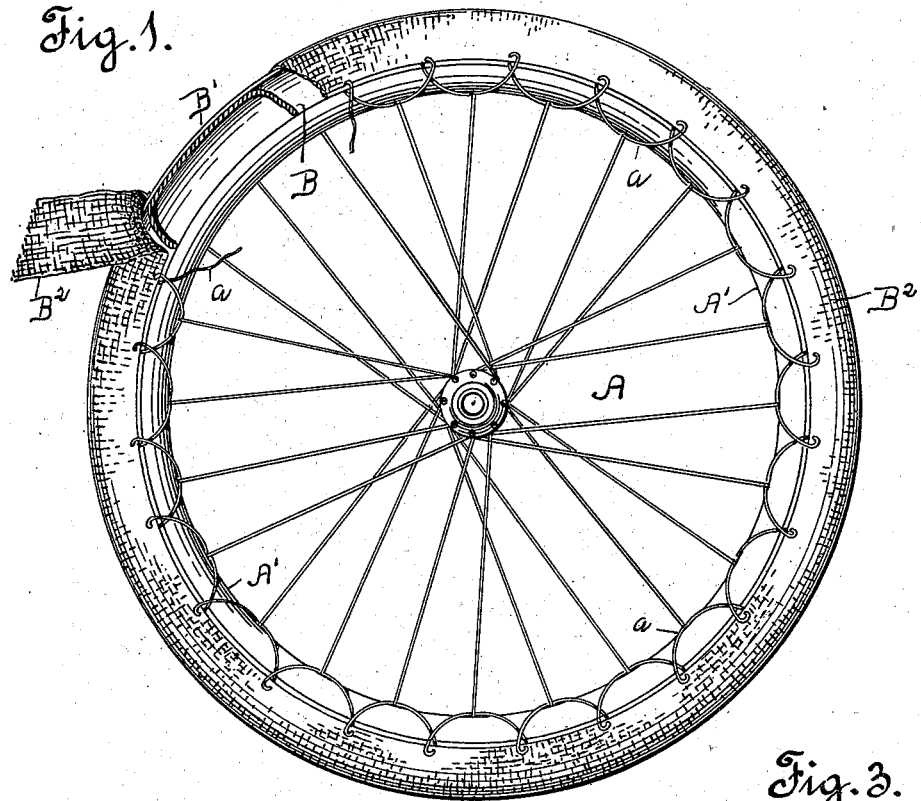
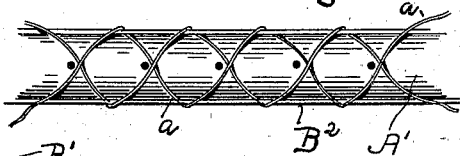
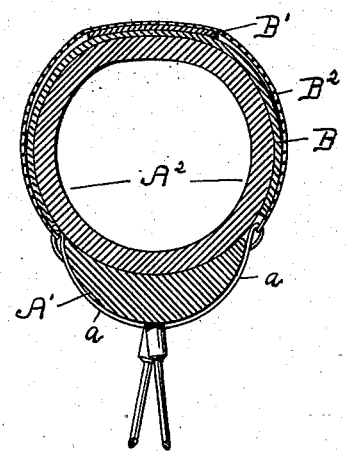

UNITED STATES PATENT OFFICE.

DOM A. ZAN, OF SAN FRANCISCO, CALIFORNIA.

PROTECTIVE ARMOR FOR PNEUMATIC TIRES.

SPECIFICATION forming part of Letters Patent No. 560,883, dated May 26, 1896.

Application filed September 18, 1895. Serial No. 562,862. (No model.)

*To all whom it may concern:*

Be it known that I, DOM A. ZAN, a citizen of the United States, residing at San Francisco, in the county of San Francisco and State of California, have invented certain new and useful Improvements in Protecting-Coverings for Bicycle-Tires; and I do hereby declare that the following is a full, clear, and exact description thereof.

My present invention relates to a certain new and useful protecting-covering for bicycle-tires, which consists in the arrangement of parts and details of construction, as will be hereinafter fully set forth in the drawings and described and pointed out in the specification.

The object of my invention is to provide a protecting-covering of such a nature that, while not taking away or detracting from the spring of the rubber or pneumatic tire of the bicycle-wheel, it will overcome the tendency of the tire to puncture by reason of the wheel moving over tacks or other sharp pieces of metal or glass located in the roadway, and which will permit of the wheel being used upon wet or moist surfaces without danger of the wheel slipping from under the rider.

In order fully to comprehend my invention, reference must be had to the accompanying sheet of drawings, forming a part of this application, wherein—

Figure 1 is a perspective view of a bicycle-wheel with my protecting-covering applied to the rubber or pneumatic tire, said covering being partly broken away. Fig. 2 is a vertical cross-sectional view of a portion of the bicycle-wheel; and Fig. 3 is an inner plan view of the rim of the wheel, showing the lacings for securing the protecting-covering over the tire of the wheel.

Referring to the drawings, the letter A indicates an ordinary bicycle-wheel, and A' the rim thereof, to which is secured the rubber or pneumatic tire A². In carrying out my invention I first secure over or cover the surface of the rubber or pneumatic tire A² with a blanket or padding B, composed of any soft or pliable material non-injurious to the surface of the tire. Over the blanket or padding is secured the metallic band B', which extends the entire circumference of the tire of the wheel, the ends of the said metallic band being united in any well-known manner. This band may be said to form a metallic tread for the wheel, the blanket or padding interposed between the tire and the band preventing the band from cutting or injuring the surface of the tire. The band or metallic tread B' is held in place by means of the outer metallic-cloth covering B², which is formed to fit snugly over the band B' and blanket or padding B and is tightly drawn thereover and held in place by the lacings $a$. These lacings pass through the reinforced edges of the metallic-cloth covering B² and over the rim A' of the wheel, Figs. 2 and 3. By means of these lacings the said wire-cloth may be made to fit neatly over the blanket or metallic tread. These parts are preferably secured over the pneumatic tire before the same is filled with air, and as the same is inflated the parts will be forced outward until entirely filled by the said rubber tire. The wire-cloth covering extends the entire circumference of the wheel, and the ends thereof I prefer to unite by interlacing, although they may be united in any suitable manner. I utilize for the outer covering wire-cloth of small or close mesh, so as to prevent the admission therebetween of small pieces of metal or similar material. Inasmuch as the said wire-cloth and the metallic tread or band is composed of flexible material the spring of the rubber or pneumatic tire, which is essential to the bicycle, is not interfered with. By simply unlacing the lacings $a$ the wire-cloth outer covering and the parts B and B' may be readily removed from the tire of the bicycle in case the parts become worn and it is desired to replace the same, or in case it is desired to use the wheel without the tire-covering. The wire-cloth covering being of meshed material will provide a roughened rolling surface to the wheel, which will prevent the slipping of the wheel while traveling over moist or wet roads. This is an important feature, for it ofttimes happens that the wheel is greatly damaged by slipping.

By my improved covering the life of the rubber tire is not only prolonged by the absence of wear thereto, but damage thereto by puncture is obviated by the interposing of the metallic tread-band.

This covering may be quickly applied to the wheel and at very slight expense, and adds but little to the weight of the wheel.

While I have shown the outer covering as being made of wire-cloth, it is obvious that any reticulated metal covering may be employed, or it may be composed of beaded material, the only requirement being that it shall be flexible, so as not to take away the spring of the rubber tire.

Having thus described my invention, what I claim as new, and desire to secure protection in by Letters Patent, is—

A protective covering for pneumatic tires consisting of a padding placed over the tire, a circumferential spring-metal band lying upon said padding, and a flexible metallic cloth fitted over and surrounding said band and said padding and adapted to be attached to the rim of the wheel.

In testimony whereof I affix my signature, in presence of two witnesses, this 29th day of August, 1895.

DOM A. ZAN.

Witnesses:
N. A. ACKER,
FRANK ZAN.